US010289661B2

(12) United States Patent
Schaad et al.

(10) Patent No.: US 10,289,661 B2
(45) Date of Patent: May 14, 2019

(54) GENERATING A COVER FOR A SECTION OF A DIGITAL MAGAZINE

(71) Applicant: Flipboard, Inc., Palo Alto, CA (US)

(72) Inventors: Raphael Mauro Schaad, Palo Alto, CA (US); Boris Aleksandrovsky, Berkeley, CA (US); Andrew Walkingshaw, San Francisco, CA (US); Arthur Anthonie van Hoff, Menlo Park, CA (US); Marcos Weskamp, Palo Alto, CA (US); Johan Prag, Mountain View, CA (US); Eric Alexander, North Miami Beach, FL (US); Eric Feng, Menlo Park, CA (US)

(73) Assignee: Flipboard, Inc., Palo Alto, CA (US)

( * ) Notice: Subject to any disclaimer, the term of this patent is extended or adjusted under 35 U.S.C. 154(b) by 220 days.

(21) Appl. No.: 13/901,536

(22) Filed: May 23, 2013

(65) Prior Publication Data

US 2014/0075296 A1 Mar. 13, 2014

Related U.S. Application Data

(60) Provisional application No. 61/752,952, filed on Jan. 15, 2013, provisional application No. 61/752,951, (Continued)

(51) Int. Cl.
*G06F 17/00* (2019.01)
*G06F 17/24* (2006.01)
(Continued)

(52) U.S. Cl.
CPC ............ *G06F 17/24* (2013.01); *G06F 17/212* (2013.01); *G06F 17/2229* (2013.01); *G06F 17/248* (2013.01)

(58) Field of Classification Search
CPC .... G06F 17/211; G06F 17/2294; G06F 17/25; G06F 17/24; G06F 17/212;
(Continued)

(56) References Cited

U.S. PATENT DOCUMENTS

| 6,038,561 | A | 3/2000 | Snyder et al. |
| 6,266,059 | B1 | 7/2001 | Matthews et al. |

(Continued)

FOREIGN PATENT DOCUMENTS

| CN | 101127784 A | 2/2008 |
| CN | 101297315 A | 10/2008 |
| WO | WO 2010/132491 A2 | 11/2010 |

OTHER PUBLICATIONS

PCT International Search Report and Written Opinion for PCT/US2013/059302, dated Jan. 28, 2014, 11 Pages.

(Continued)

*Primary Examiner* — Jason T Edwards
(74) *Attorney, Agent, or Firm* — Fenwick & West LLP

(57) ABSTRACT

A digital magazine application executing on a client device presents a digital magazine to a user including content items retrieved from one or more sources based on information associated with the user. When presenting the digital magazine, a cover is presented including an image and one or more headlines describing one or more content items included in the digital magazine. The cover may be generated by clustering content items included in the digital magazine and ranking content items in various clusters based on their characteristics. Based on the rankings, information describing content items from various clusters is included on the cover. Alternatively, the cover includes information describing content items identified based on the order in which the content items are presented by the digital magazine.

15 Claims, 6 Drawing Sheets

Related U.S. Application Data filed on Jan. 15, 2013, provisional application No. 61/700,307, filed on Sep. 12, 2012, provisional application No. 61/700,308, filed on Sep. 12, 2012.

(51) Int. Cl.
*G06F 17/21* (2006.01)
*G06F 17/22* (2006.01)

(58) Field of Classification Search
CPC .............. G06F 17/2229; G06F 17/248; G06F 17/30598; G06F 17/3071; G06F 17/3089
USPC ....................................................... 715/243
See application file for complete search history.

(56) References Cited

U.S. PATENT DOCUMENTS

| | | |
|---|---|---|
| 6,771,801 B1 | 8/2004 | Fisher et al. |
| 6,826,727 B1 | 11/2004 | Mohr et al. |
| 7,028,255 B1 | 4/2006 | Ayers |
| 7,224,892 B2 | 5/2007 | Yashiro |
| 7,272,789 B2 | 9/2007 | O'Brien |
| 7,472,340 B2 | 12/2008 | Burago |
| 7,644,356 B2 | 1/2010 | Atkins |
| 7,673,340 B1 | 3/2010 | Cohen et al. |
| 7,747,947 B2 | 6/2010 | Balinsky |
| 7,814,116 B2 | 10/2010 | Hauser |
| 8,060,830 B2 | 11/2011 | Kahn et al. |
| 8,230,075 B1 | 7/2012 | Weskamp et al. |
| 8,260,915 B1 | 9/2012 | Ashear |
| 8,478,735 B1 | 7/2013 | Archambault |
| 8,667,393 B2 | 3/2014 | Gerwin |
| 8,700,987 B2 | 4/2014 | Spalink |
| 8,788,487 B2 | 7/2014 | Stout et al. |
| 8,825,872 B2 | 9/2014 | Reisman |
| 8,826,169 B1 * | 9/2014 | Yacoub et al. ................ 715/776 |
| 9,037,592 B2 | 5/2015 | Walkingshaw et al. |
| 9,092,529 B1 | 7/2015 | Gyongyi et al. |
| 9,152,616 B2 | 10/2015 | Ying |
| 9,348,801 B2 | 5/2016 | Oliveira et al. |
| 9,396,167 B2 | 7/2016 | Doll et al. |
| 2002/0059327 A1 | 5/2002 | Starkey |
| 2002/0073178 A1 | 6/2002 | Jalili |
| 2002/0092019 A1 | 7/2002 | Marcus |
| 2002/0124050 A1 | 9/2002 | Middeljans |
| 2003/0004983 A1 | 1/2003 | Cohen |
| 2004/0078759 A1 | 4/2004 | Ohashi et al. |
| 2004/0252340 A1 | 12/2004 | Komagamine et al. |
| 2005/0033657 A1 | 2/2005 | Herrington et al. |
| 2005/0055632 A1 | 3/2005 | Schwartz et al. |
| 2005/0055635 A1 | 3/2005 | Bargerson et al. |
| 2005/0080684 A1 | 4/2005 | Blum |
| 2005/0105134 A1 | 5/2005 | Moneypenny et al. |
| 2005/0240865 A1 | 10/2005 | Atkins et al. |
| 2005/0268279 A1 | 12/2005 | Paulsen et al. |
| 2006/0026182 A1 | 2/2006 | Takeda et al. |
| 2006/0107204 A1 | 5/2006 | Epstein |
| 2006/0150092 A1 | 7/2006 | Atkins |
| 2006/0168514 A1 | 7/2006 | Tokunaga |
| 2006/0200758 A1 | 9/2006 | Atkins |
| 2006/0279555 A1 | 12/2006 | Ono |
| 2007/0011050 A1 | 1/2007 | Klopf et al. |
| 2007/0150368 A1 | 6/2007 | Arora et al. |
| 2007/0214409 A1 | 9/2007 | Miyata |
| 2007/0220411 A1 | 9/2007 | Hauser |
| 2007/0255811 A1 | 11/2007 | Pettit et al. |
| 2007/0294238 A1 | 12/2007 | Citron et al. |
| 2008/0002964 A1 | 1/2008 | Edwards |
| 2008/0033587 A1 | 2/2008 | Kurita et al. |
| 2008/0079972 A1 | 4/2008 | Goodwin et al. |
| 2008/0082903 A1 * | 4/2008 | McCurdy et al. ............ 715/200 |
| 2008/0120670 A1 | 5/2008 | Easton et al. |
| 2008/0189609 A1 | 8/2008 | Larson et al. |
| 2008/0209343 A1 | 8/2008 | Macadaan et al. |
| 2008/0288481 A1 | 11/2008 | Zeng et al. |
| 2009/0049374 A1 | 2/2009 | Echenberg |
| 2009/0064003 A1 * | 3/2009 | Harris ................ G06F 17/3089 715/763 |
| 2009/0249177 A1 | 10/2009 | Yamaji et al. |
| 2009/0254437 A1 | 10/2009 | Lee et al. |
| 2009/0307583 A1 | 12/2009 | Tonisson |
| 2010/0005380 A1 | 1/2010 | Lanahan et al. |
| 2010/0049770 A1 | 2/2010 | Ismalon |
| 2010/0083077 A1 | 4/2010 | Paulsen et al. |
| 2010/0115399 A1 | 5/2010 | Kohar et al. |
| 2010/0161369 A1 | 6/2010 | Farrell |
| 2010/0235351 A1 | 9/2010 | Iwasa et al. |
| 2010/0262490 A1 | 10/2010 | Ito et al. |
| 2010/0274815 A1 | 10/2010 | Vanasco |
| 2010/0299642 A1 | 11/2010 | Merrell et al. |
| 2010/0306249 A1 | 12/2010 | Hill et al. |
| 2010/0318571 A1 | 12/2010 | Pearlman |
| 2011/0047368 A1 | 2/2011 | Sundaramurthy |
| 2011/0052047 A1 | 3/2011 | Smith |
| 2011/0082749 A1 | 4/2011 | Rivlin et al. |
| 2011/0113041 A1 | 5/2011 | Hawthorne et al. |
| 2011/0191321 A1 | 8/2011 | Gade et al. |
| 2011/0208722 A1 | 8/2011 | Hannuksela |
| 2011/0222769 A1 | 9/2011 | Galic et al. |
| 2011/0234613 A1 * | 9/2011 | Hanson et al. ................ 345/589 |
| 2011/0238755 A1 | 9/2011 | Khan |
| 2011/0246440 A1 * | 10/2011 | Kocks ............... G06F 17/30781 707/706 |
| 2011/0249903 A1 | 10/2011 | Duga et al. |
| 2011/0265011 A1 | 10/2011 | Taylor |
| 2011/0283210 A1 | 11/2011 | Berger et al. |
| 2011/0302064 A1 | 12/2011 | Dunkeld et al. |
| 2012/0036427 A1 | 2/2012 | Oasaka et al. |
| 2012/0042240 A1 | 2/2012 | Oliveira et al. |
| 2012/0066591 A1 | 3/2012 | Hackwell |
| 2012/0079323 A1 | 3/2012 | Chincisan |
| 2012/0079328 A1 | 3/2012 | Sawaguchi |
| 2012/0089455 A1 | 4/2012 | Belani et al. |
| 2012/0102095 A1 | 4/2012 | Campbell et al. |
| 2012/0110678 A1 | 5/2012 | Kumble |
| 2012/0124505 A1 | 5/2012 | St. Jacques |
| 2012/0147163 A1 | 6/2012 | Kaminsky |
| 2012/0158476 A1 | 6/2012 | Neystadt |
| 2012/0159314 A1 | 6/2012 | Schrier et al. |
| 2012/0179572 A1 | 7/2012 | Hesse |
| 2012/0179780 A1 | 7/2012 | Spring et al. |
| 2012/0192093 A1 | 7/2012 | Migos et al. |
| 2012/0203640 A1 | 8/2012 | Karmarkar et al. |
| 2012/0221555 A1 | 8/2012 | Byrne et al. |
| 2012/0254188 A1 | 10/2012 | Koperski et al. |
| 2012/0294514 A1 | 11/2012 | Saunders et al. |
| 2012/0297490 A1 | 11/2012 | Barraclough et al. |
| 2012/0304042 A1 | 11/2012 | Pereira et al. |
| 2013/0007586 A1 | 1/2013 | Thomas |
| 2013/0021377 A1 | 1/2013 | Doll |
| 2013/0024757 A1 | 1/2013 | Doll et al. |
| 2013/0067412 A1 | 3/2013 | Leonard et al. |
| 2013/0111334 A1 | 5/2013 | Liang et al. |
| 2013/0111395 A1 | 5/2013 | Ying et al. |
| 2013/0145259 A1 * | 6/2013 | Kiefer, III ............... G06Q 30/02 715/249 |
| 2013/0226663 A1 | 8/2013 | Jahid |
| 2013/0290414 A1 | 10/2013 | Rait |
| 2013/0332593 A1 | 12/2013 | Patnaikuni et al. |
| 2014/0006406 A1 * | 1/2014 | Kafati ............... G06F 17/30598 707/738 |
| 2014/0028685 A1 | 1/2014 | Weskamp et al. |
| 2014/0032635 A1 | 1/2014 | Pimmel et al. |
| 2014/0033134 A1 | 1/2014 | Pimmel et al. |
| 2014/0033202 A1 | 1/2014 | Weskamp et al. |
| 2014/0067825 A1 | 3/2014 | Oztaskent et al. |
| 2014/0068654 A1 | 3/2014 | Marlow et al. |
| 2014/0074934 A1 | 3/2014 | Van Hoff et al. |
| 2014/0075289 A1 | 3/2014 | Brant |
| 2014/0075296 A1 | 3/2014 | Schaad et al. |
| 2014/0173397 A1 | 6/2014 | Pereira et al. |
| 2015/0019957 A1 | 1/2015 | Ying et al. |

(56) References Cited

U.S. PATENT DOCUMENTS

2015/0019958 A1     1/2015    Ying et al.
2015/0127565 A1     5/2015    Chevalier
2015/0151913 A1     6/2015    Wong

OTHER PUBLICATIONS

PCT International Search Report and Written Opinion for PCT/US2013/059297, dated Jan. 28, 2014, 15 Pages.
PCT International Search Report and Written Opinion for PCT/US2013/059298, dated Jan. 28, 2014, 15 Pages.
Office Action for Chinese Patent Application CN 2013800536830, dated Aug. 30, 2016, 32 Pages.
$2^{nd}$ Office Action for Chinese Patent Application No. CN 2013800536830, dated Apr. 27, 2017, 31 Pages (With English Translation).
Examiner's Answer to Appeal Brief for U.S. Appl. No. 14/024,465, dated Aug. 16, 2017, 15 Pages.

\* cited by examiner

GENERATING A COVER FOR A SECTION OF A DIGITAL MAGAZINE

CROSS REFERENCE TO RELATED APPLICATIONS

This application claims the benefit of U.S. Provisional Application Nos. 61/752,951, filed Jan. 15, 2013, 61/752,952, filed Jan. 15, 2013, 61/700,307, filed Sep. 12, 2012, and 61/700,308, filed Sep. 12, 2012, each of which is incorporated by reference in the entirety.

BACKGROUND

This disclosure relates generally to digital magazines, and more particularly to generating digital magazines based on user content.

Magazines typically combine information provided by a single publisher into an interesting and easy-to-read format. Conventional print magazines are designed and produced by editors of the magazine publisher, so different print magazines have specific layouts for presentation of content. This allows a publisher to regulate presentation of content in its associated magazines. For example, a publisher selects the articles, layout, cover, and other details of the magazine.

However, the increased accessibility of content through online systems has allowed users of online systems to receive content via client devices (e.g., smart phones, tablet computers, etc.). While this increases the accessibility of content, various online systems typically present content in different formats, which may make it cumbersome for users to easily consume content from different online systems. While content from various online systems may be aggregated, the aggregated content may be presented in a format that makes it difficult for users to view or interact with different types of content. For example, images and text data may be aggregated from various sources and presented in a standardized format, making it difficult for users to decipher text or image data configured for presentation in a different format.

SUMMARY

A digital magazine server receives selections from a user of content items from one or more sources, determines one or more layouts describing presentation of the content items to a user, and presents the user with pages of a digital magazine including the selected content items presented according to the one or more layouts. For example, a digital magazine application executing on a client device communicates input received from a user to the digital magazine server, which generates pages of the digital magazine for presentation via the digital magazine application. To improve user interaction with content presented via the digital magazine, a cover for the digital magazine is determined based on the content items included in the digital magazine. In various embodiments, the digital magazine application executing on the client device selects the digital magazine cover or the digital magazine server selects the digital magazine cover and communicates it to the client device for presentation by the digital magazine application.

Content items selected for presentation to a user of the digital magazine server are grouped into sections including content items having one or more common attributes, or one or more attributes with a threshold similarity. For example, content items selected by a user are grouped into one or more sections having at least one common attribute. Content items within a section may be clustered based on similarity of one or more characteristics or otherwise grouped based their characteristics. Content items in a cluster or group may be ranked based on their characteristics. For example content items in a group or cluster are ranked based on text or image data included in the various content items. In one embodiment, multiple rankings of content items in a group or cluster may be generated based on different characteristics of the content items in the section. For example, a ranking of content items in a group based on text data in the content items and a ranking of content items in the group based on image data in the content items are determined.

Based on the ranking, content items from one or more groups within the section are selected and used to generate content for the cover associated with the section. Content items from a specified number of groups within the section may be selected for inclusion on the cover. For example, the highest ranked content items within four groups are selected for inclusion on the cover. If rankings of content items are maintained based on different characteristics of the content items, one or more content items from a cluster may be selected from the multiple rankings and used to generate content describing the cluster for inclusion in the cover for the section. For example, a content item in a group having a highest ranking based on text data and a content item in the group having a highest ranking based on image data are selected and used to generate a cover for the section including the content items. The cover associated with a section is presented when the user request the section via the digital magazine application.

Alternatively, content items included in a section are formatted in a sequence describing the order in which they are presented by the digital magazine. Based on the sequence and characteristics of the content items, the cover for the section is generated. For example, an image associated with the content item having a first position in the sequence is selected as the image for the cover and text data from content items having at least a threshold position in the sequence is selected as text data presented via the cover associated with the section.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including a collection of content retrieved from a number of sources and personalized for the user. The generated digital magazine allows the user to more easily consume content that interests and inspires the user by presenting the content in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," although content in a section may include textual articles, pictures, videos, products for sale, user-generated content (e.g., content posted on a social networking system), advertisements, and any other types of content capable of display within the context of a digital magazine.

System Architecture

Figure 1:
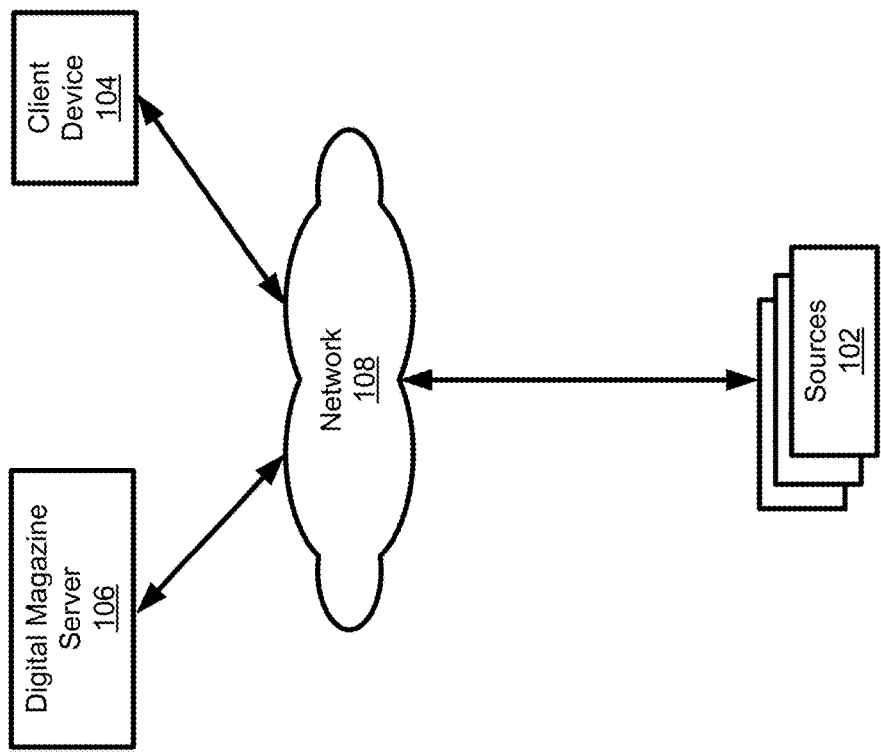
FIG. 1 is a block diagram of an embodiment of a system environment for organizing and sharing content via a digital magazine, in accordance with an embodiment of the invention.

FIG. 1 is a block diagram of a system environment 100 for a digital magazine server 106. The system environment 100 shown by FIG. 1 comprises one or more sources 102, a network 108, a client device 104, and the digital magazine server 106. In alternative configurations, different and/or additional components may be included in the system environment 100. The embodiments described herein can be adapted to online systems that are not digital magazine severs 106.

A source 102 is a computing system capable of providing various types of content to a client device 104. Examples of content provided by a source 102 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 102 may be received from a publisher (e.g., stories about news events, product information, entertainment, or educational material) and distributed by the source 102, or a source may be a publisher of content it generates. For convenience, content from a source, regardless of its composition, may be referred to herein as an "article," a "content item," or as "content." A content item may include various types of content, such as text, images, and video.

The sources 102 communicate with the client device 104 and the digital magazine server 106 via the network 108, which may comprise any combination of local area and/or wide area networks, using both wired and/or wireless communication systems. In one embodiment, the network 108 uses standard communications technologies and/or protocols. For example, the network 108 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 108 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 108 may be represented using any suitable format, such as hypertext markup language (HTML) or extensible markup language (XML). In some embodiments, all or some of the communication links of the network 108 may be encrypted using any suitable technique or techniques.

The client device 104 is one or more computing devices capable of receiving user input as well as transmitting and/or receiving data via the network 108. In one embodiment, the client device 110 is a conventional computer system, such as a desktop or a laptop computer. Alternatively, the client device 104 may be a device having computer functionality, such as a personal digital assistant (PDA), a mobile telephone, a smartphone or another suitable device. The client device 104 is configured to communicate via the network 108. In one embodiment, the client device 104 executes an application allowing a user of the client device 110 to interact with the digital magazine server 106. For example, an application executing on the client device 104 communicates instructions or requests for content items to the digital magazine server 106 to modify content presented to a user of the client device 104. As another example, the client device 104 executes a browser that receives pages from the digital magazine server 106 and presents the pages to a user of the client device 104. In another embodiment, the client device 104 interacts with the digital magazine server 106 through an application programming interface (API) running on a native operating system of the client device 110, such as IOS® or ANDROID™. While FIG. 1 shows a single client device 104, in various embodiments, any number of client devices 130 may communicate with the digital magazine server 106.

A display device included in the client device 104 presents content items to a user of the client device 104. For example, the display device is a liquid crystal display (LCD), an organic light emitting diode (OLED) display, an active matrix liquid crystal display (AMLCD), or any other suitable device. Different client devices 104 may have display devices with different characteristics. For example, different client devices 104 have display devices with different display areas, different resolutions, or differences in other characteristics.

One or more input devices included in the client device 104 receive input from the user. Different input devices may be included in the client device 104. For example, the client device 104 includes a touch-sensitive display for receiving input data, commands, or information from a user. Using a touch-sensitive display allows the client device 104 to combine the display device and an input device, simplifying user interaction with presented content items. In other embodiments, the client device may include a keyboard, a trackpad, a mouse, or any other device capable of receiving input from a user. Additionally, the client device may include multiple input devices in some embodiments.

The client device 104 may operate in a locked state when one or more criteria are satisfied. For example, if the client device 104 does not receive an input via an input device for at least a threshold amount of time, the client devices enters the locked state. As another example, the client device 104 may operate in the locked state when a specific input is received from a user. While in the locked state, the client device 104 provides a reduced set of functionality to a user and responds to a reduce set of inputs received from the user. For example, while in the locked state, the client device 104 presents a display including a limited amount of information (a "lock screen") and performs actions when an input from a set of inputs is received while remaining inactive when an input not in the set of inputs is received. When a trigger input is received, the client device 104 exits the locked state and provides increased functionality to the user. Presentation of content to a user while a client device 104 is in a locked state is further described below in conjunction with FIG. 5.

The digital magazine server 106 receives content items from one or more sources 102, generates pages in a digital magazine by processing the received content, and serves the pages to the client device 104. To provide content to a user, the digital magazine server 106 generates one or more pages for presentation to a user based on content items obtained from one or more sources 102 and information describing organization and presentation of content items. For example, the digital magazine server 106 determines a page layout including various content items based on information associated with a user and generates a page including the content items arranged according to the determined layout for presentation to the user via the client device 104. This allows the user to access content items via the client device 104 in a format that enhances the user's interaction with and consumption of the content items. Accordingly, the digital magazine server 106 provides a user with content items in a format similar to the format used by print magazines. This presentation of content items by the digital magazine server 106 allows a user to interact with content items from multiple sources 102 via the client device 104 with reduced inconvenience of horizontal or vertical scrolling to access various content items.

Page Templates

The digital magazine server 106 includes one or more page templates each describing a spatial arrangement ("layout") of content items relative to each other on a page for presentation by a client device 104. A page template includes one or more slots, each configured to present one or more content items. In some embodiments, slots in a page template may be configured to present a particular type of content item or to present a content item having one or more characteristics. For example, a slot in a page template is configured to present a content item that is an image while another slot in the page template is configured to present a content item including text data. Each slot has a size (e.g., small, medium, or large) and an aspect ratio. One or more page templates may be associated with types of client devices 104, allowing content items to be presented in different relative locations when a user views the content items using different client devices 104. Additionally, page templates may be associated with sources 102, allowing a source 102 to influence the presentation of content items from the source 102 presented to a user via the digital magazine server 106. Examples of page templates are further described in U.S. patent application Ser. No. 13/187,840, filed on Jul. 21, 2011, which is hereby incorporated by reference in its entirety.

Figure 2:
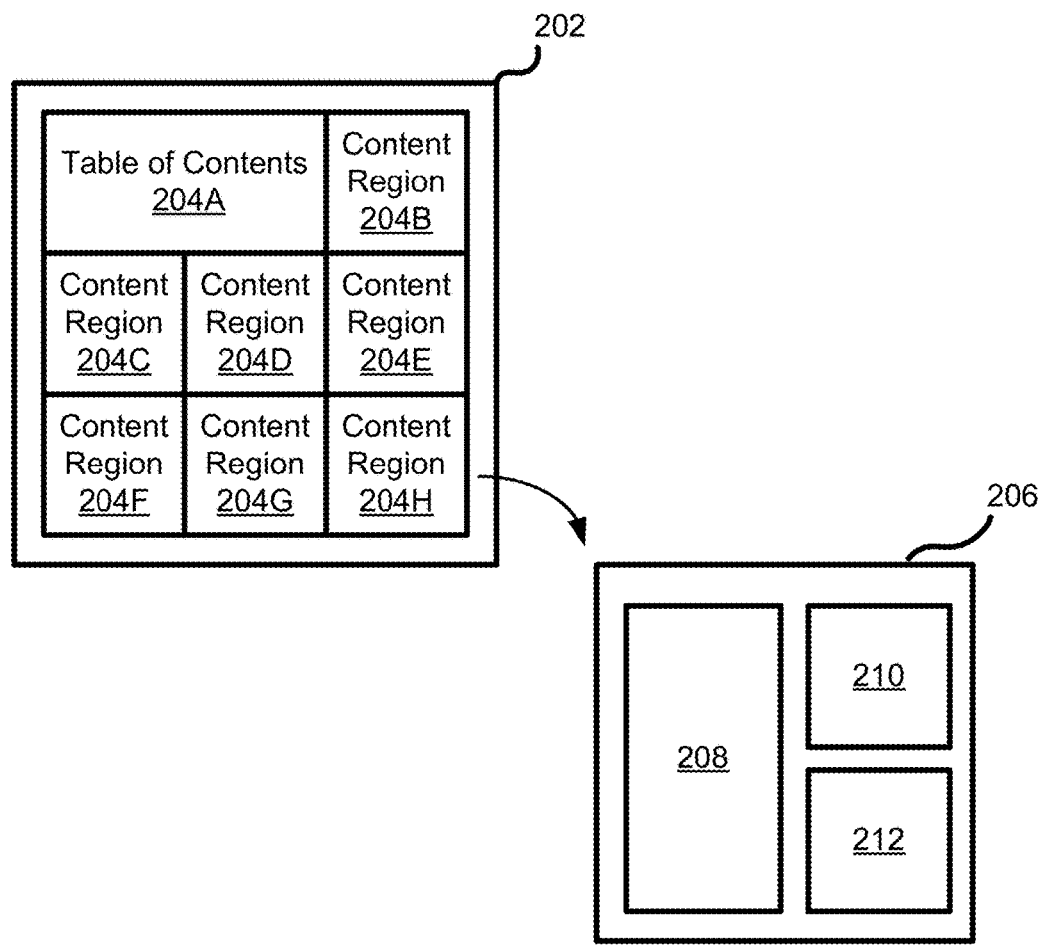
FIG. 2 is an example of a page template for presenting content using a digital magazine, in accordance with an embodiment of the invention.

FIG. 2 illustrates an example page template 202 having multiple rectangular slots each configured to present a content item. Other page templates with different configurations of slots may be used by the content processing system 106 to present one or more content items received from sources 102. In some embodiments, one or more slots in a page template are reserved for presentation of content items having specific characteristics or for presentation of a specific type of content item. For example, one or more slots in a page template are reserved for content items that are images. As another example, a page template includes a slot reserved for presentation of social network status updates, which may be grouped and displayed as a list in the slot included in the page template. In another example, one or more slots in a page template are associated with content items received from a specific source 102 or provided by a specific publisher (e.g., a specified news organization, a specified magazine magazines, content generated by a specified user, etc.).

As shown in FIG. 2, when a content processing system 106 generates a page, the content processing system 106 populates slots in a page template 202 with content items. Information identifying the page template 202 and associations between content items and slots in the page template 202 is stored and used to generate the page. For example, to present a page to a user, the page template 202 associated with the page is retrieved and content items associated with slots within the page template 202 are retrieved; the page is generated by including content items their associated slots of the page template 202. Hence, the page includes various "content regions" that display content associated with a slot in a location specified by the slot.

A content region 204 may present image data, text, data, a combination of image and text data, or any other information retrieved from a corresponding content item. For example, in FIG. 2, the content region 204A represents a table of contents identifying sections of a digital magazine, and content associated with the various sections are presented in content regions 204B-204H. For example, content region 204A includes text or other data indicating that the presented data is a table of contents, such the text "Cover Stories featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the content processing system 106 and organized as a section. Content items included in a section may be related topically and include text and/or images related to the topic.

Sections may be further organized into subsections, with content items associated with one or more subsections presented in content regions. A page template associated with a subsection may be identified, and slots in the page template associated with the subsection used to determine presentation of content items from the subsection relative to each other. Referring to FIG. 2, the content region 204H includes a content item associated with a newspaper to indicate a section including content items retrieved from the newspaper. When a user interacts with the content region 204, a page template associated with the section is retrieved, as well as content items associated with the section. Based on the page template associated with the section and the content items, the digital magazine server 106 generates a page presenting the content items based on the layout described by the slots of the page template. For example, in FIG. 2, the section page 206 includes content regions 208, 210, 212 presenting content items associated with the section. The content regions 208, 210, 212 may include content items associated with various subsections including content items having one or more common characteristics (e.g., topics, authors, etc.). Hence, a subsection may include one or more subsections, allowing hierarchical organization and presentation of content items by a digital magazine.

Section Cover

Figure 3:
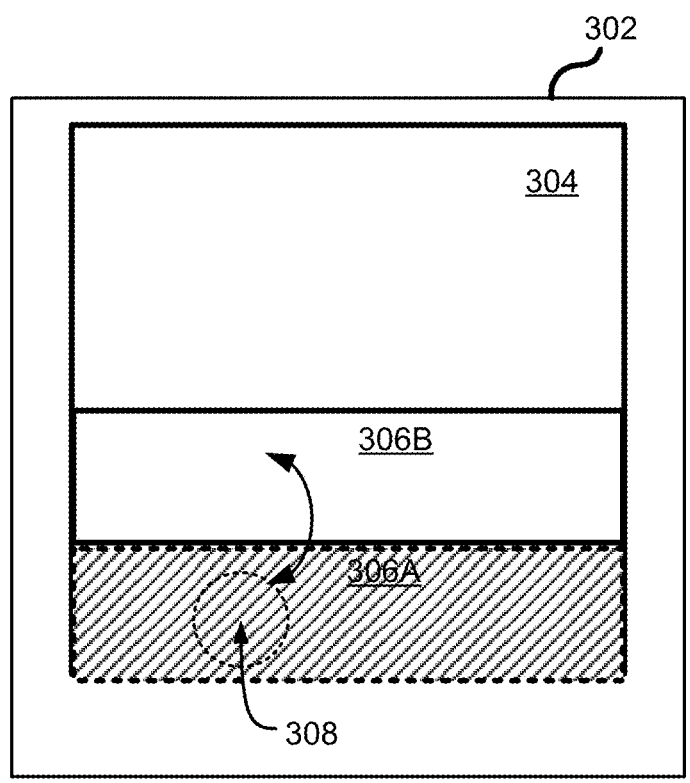
FIG. 3 is an example a user interface for interacting with a section of a digital magazine including content items content selected by a user, in accordance with an embodiment of the invention.

FIG. 3 shows an example layout of a user interface for interacting with a section including one or more content items for presentation to a user of the digital magazine server 106. In the example of FIG. 3, the user interface presents a cover 302 associated with a section of the digital magazine. As further described below in conjunction with FIGS. 4A-5, the cover 302 may include a cover image and text data selected from the content items included in the section. Although FIG. 3 shows presentation of a cover 302 for a section, a cover 302 may also be presented for the digital magazine as a whole, with the content of the cover determined based on the content items included in the digital magazine.

The content items included in the section associated with the cover 302 may be selected by or generated by a user of the digital magazine server 102. In some embodiments, content items included in the section associated with the cover 302 may be identified by the digital magazine server 106 based on information associated with the user or actions performed by the user. The cover 302 may include multiple regions describing content items in the section. For example, the cover 302 includes a cover image 304, which may be an image or a combination of image and text selected from the content items in the section. The cover 302 is presented when a user requests content items included in the section. For example, if a user accesses a content region associated with a section, the cover 302 associated with the section is presented to the user.

The cover image 304, or the cover 302, may also include one or more user interface elements configured to receive input from a user viewing the cover 302. Information describing the interface element receiving input from a user is used to identify additional content items for presentation to the user. For example, content items associated with a selected interface element are retrieved and presented to the user. An interface element may be a portion or region of the cover image 304, and when a user clicks, taps, or provides another suitable input to an interface element one or more content items associated with the accessed the interface element are retrieved from the digital magazine server 106 for presentation via a page presented using the client device 102.

In one embodiment, the digital magazine server 106 displays comments or other metadata associated with a content item associated with an accessed interface element. For example, comments or metadata associated with a content item are displayed proximate to the content item (e.g., below the first content item) in a portion of a display area that does not obscure viewing of the content item. Additional information associated with a content item or interface elements providing additional functionality may also be presented via the cover 302.

If a cover 302 associated with a section is presented by a client device 104 including a touch-sensitive display as an input device, one or more gestures may be used to access content items associated with the section or associated with another section. For example, if a user contacts a region 306A of the cover image 304 via the touch-sensitive display and continues contacting the touch-sensitive display until reaching another region 306B of the cover image 304, a content item associated with the section is presented. As another example, a different section or a previously displayed content item may be presented if the user contacts a region 306B of the cover image 304 via the touch-sensitive display and continues contacting the touch-sensitive display until reaching another region 306A of the touch-sensitive display. However, in other embodiments, any suitable input or inputs may be used to access content items associated with a section or to access different sections of a digital magazine.

Cover Selection

The digital magazine server 106 may generate a cover 302 for a section or for a digital magazine based on content items associated with the section or with the digital magazine, respectively. For example, the digital magazine server 106 selects a cover image 304 for a section based on content items associated with the section. In some embodiments, a user may specify a cover 302 for a section that is presented when the section is accessed, and the digital magazine server 106 generates a cover 302 based on content items in a section for which the user has not specified a cover 302. Selection of a cover 302 for a section may be performed by a digital magazine application associated with the digital magazine server 106 and executing on a client device 104 or may be performed by the digital magazine server 106.

Generally, a cover 302 provides a representation of the content items in a section to present a user with an indication of the most interesting content items in the section. As described above, a section includes content items having one or more common attributes or one or more attributes having at least a threshold degree of similarity. Examples of attributes of a content item include: a source 102 from which the content item was retrieved, an author, a date, a topic, and a user-specified classification. One or more content items from a section are selected and used to generate the cover 302 for the section. For example, a content item from a section is selected and included as a cover image 304 on a cover 302 for the section Selecting a cover 302 for a section based on the content items in the section allows the cover 302 to include a variety of content items or types of content items from the section.

In one embodiment, content items within a section clustered based on to the number of content items to be included in a cover 302 for the section. For example, the number of content items to be included in a cover 302 depends on the display area of the client device 104 on which the cover 302 is to be presented. In one embodiment, when a section is requested from the digital magazine server 106, a request for the section includes information describing the client device 104 on which the cover is to be presented. For example, the request includes a device identifier or information describing the display area of the client device 104. Thus, more content items may be included in a cover 302 for presentation by a client device 104 device with at least a threshold display area and fewer content items may be included in a cover 302 for presentation by a client device 104 with less than the threshold display area. Typically, between two and eight content items are included in a cover 302, resulting in generation of between two and eight clusters of content items in the section.

Clustering of content items in a section may be performed by any suitable technique, such as k-means clustering. To determine the "distance" between content items for generating clusters, a feature vector is generated for each content item in the cluster based on metadata associated with the content item. For example, topics associated with each content item are used to generate the content item's feature vector, though any suitable data representing a content item may be used to generate the content item's feature vector. Prior to clustering, feature vectors for content items are processed by a dimensionality reducing function. In one embodiment, to measure distance between content items, the cosine similarity between feature vectors associated with the content items is measured, and content items associated with feature vectors having less than a threshold distance are included in a cluster, or "group."

After generating clusters of content items within a section, one or more content items are selected from one or more clusters for inclusion on the cover 302. In one embodiment, content items within a cluster are ranked and one or more content items are selected from the cluster based on the ranking. For example, content items within a cluster are ranked based on one or more characteristics, such as likelihood of user interaction with various content items, interaction of other users with the content items, relevance to a topic associated with the section including the cluster, or any other suitable characteristic. In one embodiment, a content item is selected from each cluster and included on the cover 302. Information from a content item may be extracted and included on the cover 302. For example, the cover 302 in one embodiment includes a headline and a photograph identified from one or more content items in a cluster. To select the headline and photograph, content items in the cluster are rated according to their likely interest to the user viewing the cover 302 based on the popularity of the content items among other users along with other considerations, such as prior interactions with content items by the user. In one embodiment, the rating is based on a content selection system recommending the content item to the user.

In one embodiment, a headline for a cluster is selected from the content item in the cluster having the highest ranking. A headline may be selected for each cluster. In one embodiment, the image associated with a cluster is an image associated with the content item from which the headline is selected. Alternatively, the image is selected from a content item retrieved from a different source than the content item from which the headline was identified. For example, if a news story from a specific source is the highest-rated content item in a cluster based on text data, a headline for the cluster is determined from the news story, while a news story from a different source has the highest-rated content item based on image data; by determining that the two content items associated with each news story have at least a threshold similarity, the highest-rated content item based on text data may be paired with the highest-rated content item based on image data, and the image for the cluster is based on the content item from the different source.

To select an image for a cluster, images associated with content items in the cluster are analyzed to identify images relating to a topic associated with a selected content item (e.g., the highest-ranked content item). The identified images are scored by an image scoring algorithm to determine the likelihood of user-interest in the images. For example, an image scoring algorithm determines an image score based on image composition, focus, color, and other attributes of the image. Based on the scoring, an image is selected for presentation on the cover 302 along with the headline selected for the cluster. For example, the highest-scored image is selected for presentation along with the determined headline on the cover 302 associated with the section.

Figure 4A:
FIGS. 4A and 4B are examples of a cover generated for a user section, in accordance with an embodiment of the invention.
Figure 4B:
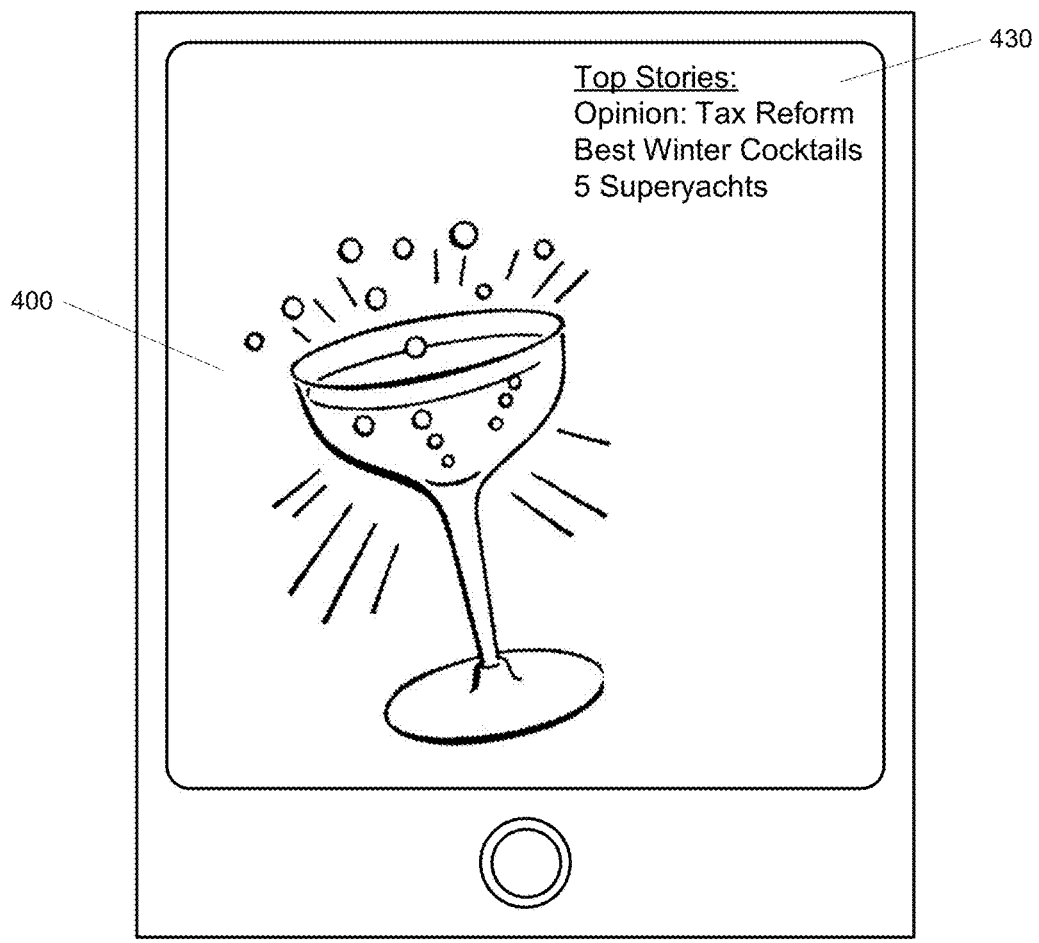

FIGS. 4A and 4B illustrate examples of a cover generated for a section. In the embodiments shown by FIGS. 4A and 4B, the cover is generated based on content items that were selected for presentation at the beginning of the section (or at the beginning of the digital magazine if the cover is for the digital magazine itself). For example, content items having at least a threshold location in a sequence for presentation of content items in the section are used to generate the cover. The cover example shown in FIG. 4A includes one image 400 and a lead story 410, as well as one or more supplemental stories 420. To determine the image 400 for the cover, the content item selected for presentation to the user first within the section associated with either an image or a headline is selected. If the selected content item is associated with an image and a headline, the image and headline are presented together as the image 400 and lead story 410, allowing the cover to present the user with information about the initial content item in the section.

Content items in the section having a position in the sequence for presentation subsequent to the content item from which the image 400 or the lead story 410 are parsed to identify the content items including headlines. A threshold number of subsequent content items having headlines are selected and used to determine content presented as supplemental stories 420. In this embodiment, because the cover image 400 and lead story 410 are associated with the same content item (or associated with the same topic), the lead story 410 is prominently placed on the cover, while the supplemental stories 420 are less prominently placed. In the example of FIG. 4A, the supplemental stories 420 are presented in a less prominent location on the cover or presented using a smaller font size than the lead story 410.

FIG. 4B illustrates a cover where the content item used to determine the image 400 does not also have a headline. For example, FIG. 4B shows an example where a content item to be initially presented in the section includes an image but does not include a headline. Accordingly, the image 400 is selected from the content item, but stories 430 describing headlines from various content items are presented by the cover. For example, an image 400 from the content item to be presented first is shown while stories 430 describing headlines from subsequently presented content items are shown. As another example, the headline of the content item to be presented first is identified as the first story 430, while an image 400 from a subsequent content item is presented and headlines from subsequent content items are identified as additional stories 430. In FIG. 4B, the image 400 is unrelated to the initial story 430, so the stories 430 are not differentiated with respect to each other (i.e., each of the stories are presented in a consistent size and format, and stories 430 are not displayed more prominently than other stories 430).

Client Device Cover Screen

Figure 5:
FIG. 5 is an example of a cover presented when a client device is in a locked state, in accordance with an embodiment of the invention.

FIG. 5 illustrates an example of a cover associated with a section displayed while a client device 104 is in a locked state. As described above in conjunction with FIG. 1, some client devices 104 may operate in a locked state that provides reduced functionality when one or more conditions are satisfied. In one embodiment, when a client device 104 executing a digital magazine application associated with the digital magazine server 106 enters a locked state, a request for a cover is communicated to the digital magazine server 106 via the network 108. The request may indicate that the client device 104 is in a locked state, include a user identifier used by the digital magazine server 106 to identify the client device user, and information describing the client device 104 (e.g., display area). Using the methods described above in conjunction with FIGS. 3-4B, the digital magazine server 106, or the digital magazine application, generates a cover for presentation via the client device 104. Alternatively, the digital magazine server 106 or digital magazine application generates a cover that is stored and presented when the client device 104 enters the locked state.

Hence, the cover image is displayed on the client device 104 when the client device 104 is inactive or has not been accessed by the user within a threshold amount of time. When the user wishes to use the client device 104, the user provides a specific type of input to the client device 104 to terminate the locked state. For example, the user provides a specific type of gesture input to a touch-sensitive display of the client device (e.g., a "flip" or "swipe" received in a specific region of the touch-sensitive display). When the input is received, the client device 104 may provide the user with a homescreen including content or access to applications or may provide the user with a prompt to provide authentication information (e.g., a password-entry screen).

In addition to content items provided by sources 102 and received by the digital magazine server 106, the generated cover may include information describing events, activities, or other data local to the client device 104. In one embodiment, the client device 104 receives notifications from programs and applications on the client device 104 and information describing these notifications is included in the cover by the digital magazine application executing on the client device 104. For example, an application sharing or receiving photos from other client devices 104 is executed by the client device 104; when the application receives a photo from another client device 104, a content item describing receipt of the photo is added to a section of the digital magazine. The content item describing receipt of the photo may be used to generate a headline or an image presented on the cover shown to the user. As content items are updated by sources 102, digital magazine server 106, or client device 104 applications, the cover displayed on the client device 104 is adjusted to account for the updated content items.

Based on the user's activities, the content items described by the cover may also be modified. For example, a user logged into a client device 104 may have preferences for certain source feeds and content items associated with applications on the client device 104; hence, the cover displayed when the client device 104 is in a locked state is based on content items associated with the user. If the user logs out of the client device 104, content items associated with the user may be withheld from generation of a cover, so the cover presented when the client device 104 is in a locked state does not include information describing content items personal to the user. Content items associated with an additional user may be used to generate the cover presented when the client device 104 is in a locked state when the additional user logs into the client device 104, allowing the cover dynamically change based on content items associated with different users.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for generating a digital magazine for a user comprising:
   identifying a plurality of content items from a plurality of sources for inclusion in the digital magazine by a digital magazine server, each content item including an image and text data and each source comprising a computing system providing one or more content items to client devices;

generating a plurality of groups of content items from the plurality of content items based on characteristics of the content items, each group including content items having a common characteristic, the common characteristic comprising one or more of: a source from which the digital magazine server obtained a group of content items, an author of the group of content items, a date associated with content items of the group, a topic associated with content items of the group, a classification of content items of the group received by the digital magazine server from the user, and any combination thereof;

generating a ranking of content items within each group based on text data included in each content item within a group, prior interactions by the user with content items of the group, and popularity of content items of the group among other users;

generating an additional ranking of content items within each group based on image scores for images included in each content item within the group, an image score for an image based on attributes of the image including composition of the image, color of the image, focus of the image, and any combination thereof;

receiving a request to view the digital magazine from a client device, the request identifying a display area of the client device;

selecting a set of groups based at least in part on the display area of the client device, the set including a number of groups that is directly related to a size of the display area of the client device;

selecting a plurality of content items from each of the groups in the set, a content item selected from a group in the set having a threshold location in the ranking of the content items within the group in the set, and selecting a plurality of additional content items from each of the groups in the set, an additional content item selected from the group in the set having a highest position in the additional ranking of the content items within the group in the set;

generating a cover for the digital magazine based on the plurality of the selected content items and the plurality of the selected additional content items, the cover including a cover image from a selected additional content item of the group in the set having a highest image score and the cover including headlines for each of the groups in the set comprising text data extracted from a selected content items from each groups in the set, a headline for each group in the set obtained from a content item from the plurality of the selected content items of a group in the set having a highest position in the ranking of content items within the group of the set, at least one of the headlines comprising text data from an alternative selected content item different than the selected additional content item including the cover image where the alternative selected content item has at least a threshold similarity to the selected additional content item including the cover image and the alternative selected content item was obtained by the digital magazine server from an alternative source that is different than a source from which the digital magazine server obtained the selected content item including the cover image; and providing the cover to the client device for presentation.

2. The computer-implemented method of claim 1, wherein generating the cover for the digital magazine based on the plurality of the selected content items and the plurality of the selected additional content items comprises:

selecting a content item from each group in the set of groups based at least in part on the rankings of content items within each group in the set of groups;

selecting an image included in at least one of the selected content items; and generating the cover image based on the selected image.

3. The computer-implemented method of claim 1, wherein generating the plurality of groups of content items from the plurality of content items based on characteristics of the content items comprises:

clustering the plurality of content items based on metadata associated with each of the content items.

4. The computer-implemented method of claim 3, wherein the metadata associated with each of the content items comprises one or more topics associated with each of the content items.

5. The computer-implemented method of claim 1, wherein the characteristics of each content item within the group are selected from a group consisting of: likelihood of user interaction with a content item, interaction of other users with the content item, relevance of the content item to a topic, and any combination thereof.

6. The computer-implemented method of claim 1, wherein receiving the request to view the digital magazine from the client device includes an indication the client device is in a locked state, and wherein providing the cover to the client device for presentation comprises:

providing the cover to the client device for presentation while the client device is in the locked state.

7. The computer-implemented method of claim 6, wherein one or more content items in the plurality of content items are received from an application executing on the client device.

8. The computer-implemented method of claim 1, wherein the plurality of content items includes a link to another digital magazine.

9. A computer-implemented method for generating a digital magazine for a user comprising:

identifying a plurality of content items from a plurality of sources for inclusion in the digital magazine by a digital magazine server, each content item including an image and text data and each source comprising a computing system providing one or more content items to client devices;

generating a plurality of groups of content items from the plurality of content items based on characteristics of the content items, each group including content items having a common characteristic, the common characteristic comprising one or more of: a source from which the digital magazine server obtained a group of content items, an author of the group of content items, a date associated with content items of the group, a topic associated with content items of the group, a classification of content items of the group received by the digital magazine server from the user, and any combination thereof;

generating a ranking of content items within each group based on text data included in each content item within a group, prior interactions by the user with content items of a group in the set, and popularity of content items of the group in the set among other users;

generating an additional ranking of content items within each group based on image scores for images included in each content item within the group, an image score for an image based on attributes of the image including composition of the image, color of the image, focus of the image, and any combination thereof;

determining a sequence specifying an order in which content items within each group are to be presented within the digital magazine;

receiving a request to view the digital magazine from a client device, the request identifying a display area of the client device;

selecting a set of groups based at least in part on the display area of the client device, the set including a number of groups that is directly related to a size of the display area of the client device;

generating a cover for the digital magazine based on a plurality of the content items, the cover including a cover image from a content item of a group of the set having a highest image score and the cover including headlines for each of one or more groups, a headline for the group of the set comprising text data extracted from a content item from the group of the set having a highest position in the ranking of content items within the group of the set, at least one of the headlines comprising text data obtained from a different content item than the content item including the cover image, the different content item having at least a threshold similarity to the content item including the cover image and the different content item identified by the digital magazine server from an alternative source that is different than a source from which the digital magazine server identified the content item including the cover image, the headlines presented by the cover in an order specified by the determined sequence; and providing the cover to the client device for presentation.

10. The computer-implemented method of claim 9, wherein the content item of the group of the set including the cover image comprises:

a content item having a highest position in the sequence and including one or more images.

11. The computer-implemented method of claim 10, wherein headlines for each of the groups of the set are extracted from content items having positions lower in the sequence than the content item including the cover image.

12. The computer-implemented method of claim 9, wherein receiving the request to view the digital magazine from the client device includes an indication the client device is in a locked state.

13. The computer-implemented method of claim 12, wherein providing the cover to the client device for presentation comprises:

providing the cover to the client device for presentation while the client device is in the locked state.

14. A computer-implemented method for generating a cover associated with a digital magazine comprising:

receiving information describing a plurality of content items included in a digital magazine generated for presentation to a user of a client device by an application executing on the client device and associated with the digital magazine, each content item obtained from a source comprising a computing system providing one or more content items to client devices;

receiving content items associated with a specific source comprising an additional application executing on the client device;

generating a plurality of groups of content items from the plurality of content items and the content items associated with the additional application based on characteristics of the content items, each group including content items having a common characteristic, the common characteristic comprising one or more of: a source from which a group of content items was obtained, an author of the group of content items, a date associated with content items of the group, a topic associated with content items of the group, a classification of content items of the group received by the application associated with the digital magazine from the user, and any combination thereof;

generating a ranking of content items within each group based on text data included in each content item within a group, prior interactions by the user with content items of the group, and popularity of content items of the group among other users;

generating an additional ranking of content items within each group based on image scores for images included in each content item within the group, an image score for an image based on attributes of the image including composition of the image, color of the image, focus of the image, and any combination thereof;

selecting a set of groups based at least in part on the display area of the client device, the set including a number of groups that is directly related to a size of a display area of the client device;

selecting a plurality of content items from each of the groups in the set, a content item selected from a group in the set having a threshold location in the ranking of the content items within the group in the set, and selecting a plurality of additional content items from each of the groups in the set, an additional content item selected from the group in the set having a highest position in the additional ranking of the content items within the group in the set;

generating a cover for the digital magazine based on the plurality of content items and the plurality of additional selected content items, the cover including a cover image from a selected additional content item of the group in the set having a highest image score and the cover including headlines for each of the groups in the set comprising text data extracted from a selected content item from each of the groups in the set, a headline for each group in the set obtained from a content item from the plurality of the selected content items of the group in the set having a highest position in the ranking of content items within the group of the set, at least one of the headlines comprising text data from an alternative selected content item that is different than the selected additional content item including the cover image, where the alternative selected content item has at least a threshold similarity to the selected additional content item including the cover image and the alternative content item was obtained from an alternative source that is different from a source from which the selected additional content item including the cover image was obtained, and at least one headline comprising text data extracted from a content item associated with the specific source comprising the additional application executing on the client device; and presenting the cover to the user responsive to the client device operating in a locked state.

15. The computer-implemented method of claim 14, wherein the content items associated with the application executing on the client device include content items associated with the user of the client device and do not include content items associated with an additional user of the client device.

* * * * *